A. S. BELTINK.
COOLING COIL.
APPLICATION FILED MAR. 7, 1916.

1,235,181.

Patented July 31, 1917.

WITNESSES:

INVENTOR
Augustine S. Beltink
BY Strong & Townsend
ATTORNEYS

UNITED STATES PATENT OFFICE.

AUGUSTINE S. BELTINK, OF OAKLAND, CALIFORNIA.

COOLING-COIL.

1,235,181.                     Specification of Letters Patent.        Patented July 31, 1917.

Application filed March 7, 1916. Serial No. 82,585.

*To all whom it may concern:*

Be it known that I, AUGUSTINE S. BELTINK, a citizen of the United States, residing at Oakland, in the county of Alameda and State of California, have invented new and useful Improvements in Cooling-Coils, of which the following is a specification.

This invention relates to cooling coils; and has for its object to improve the construction and operation of the same.

In carrying out this object, I employ a novel core, on which is wound a coil of pipes in such manner as to permit the ice to remain in continuous and even contact therewith and whereby danger of injury to the pipes is overcome.

One form which my invention may assume is exemplified in the following description and illustrated in the accompanying drawings, in which—

Figure 1:
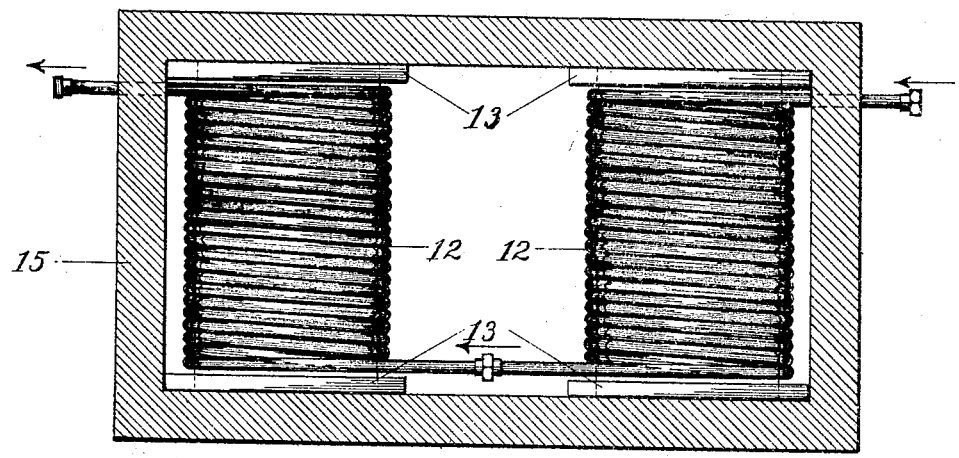
Figure 1 shows a plan view of a device embodying my invention.
Figure 2:
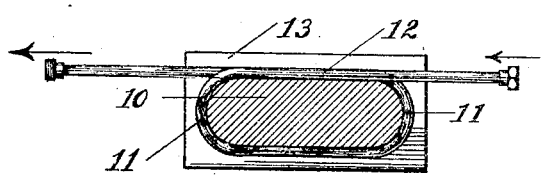
Fig. 2 shows a transverse, sectional view of my improved coil and core.
Figure 3:
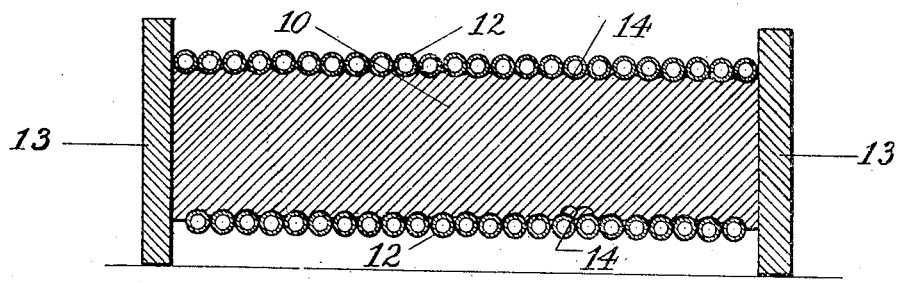
Fig. 3 shows a longitudinal sectional view of the same.

As shown in the drawings, I provide a flat core 10, preferably of wood, having rounded sides 11 to facilitate the winding of the pipes 12. These pipes are laid in close succession in coil fashion and may have their ends connected to other similar coils or to an intake or outlet for the liquid to be cooled. The ends of the core-board are fitted with supports 13 to hold the pipes in place, and these supports, preferably, project a slight distance beyond the plane of the pipes and thus serve to prevent crushing of the thin walls of the pipes either against the bottom of the tank or by the contact of falling ice therewith. I may also provide the core-board with grooves 14 to receive the pipes and thus give them a greater supporting area.

In operation, I provide a cooling tank 15, of any suitable form, and arrange one or more of the flat cooling coils constructed in accordance with my invention upon its bottom. Ice is placed upon the tops of these coils and no further attention is required except to replenish the ice. The upper layer of pipes will be cooled by a direct contact with the ice, whereas the lower layer will be cooled by the water from the melting ice.

Pipes wound upon this core will last longer because of the reinforcement received and the close contact of the pipes. Further, the pipes are held against vibration and are protected at the ends of the coil by the end pieces 13 of the core. There is also a great saving of ice in connection with this device due to the horizontal arrangement of the coils, whereby they benefit from the water caused by the melting of the ice.

The flat surface of the coils insures continuous contact between the upper layer of pipes and the ice and there is nothing present to prevent the natural settling of the ice. In this latter connection an important advantage is the saving of labor ordinarily expended in turning and breaking the ice in order to keep it in even contact with the coils.

Having thus described my invention, what I claim and desire to secure by Letters Patent is—

In a cooling device, a container, a core having a broad flat upper face and having grooves therein, a pipe positioned around the core and engaging within the grooves to prevent displacement thereof, plates secured to the ends of the core and abutting the front and rear sides of the container, to hold the core against longitudinal movement, one end of the pipe being horizontally extended through an end of the container, to hold the core in position, and said end plates being extended upwardly to project above the coils and said horizontally extended end of the pipe to protect the coils and said pipe end.

In testimony whereof I have hereunto set my hand in the presence of two subscribing witnesses.

AUGUSTINE S. BELTINK.

Witnesses:
LEANDER J. MURPHY,
HARRY H. COLOMBEL.

Copies of this patent may be obtained for five cents each, by addressing the "Commissioner of Patents, Washington, D. C."